(12) United States Patent
Kim et al.

(10) Patent No.: US 9,203,060 B2
(45) Date of Patent: Dec. 1, 2015

(54) SECONDARY BATTERY

(75) Inventors: Sung-Bae Kim, Suwon-si (KR);
Yong-Sam Kim, Suwon-si (KR);
Dae-Won Han, Suwon-si (KR);
Sang-Won Byun, Suwon-si (KR);
Byung-Kyu Ahn, Suwon-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 1748 days.

(21) Appl. No.: 12/642,672

(22) Filed: Dec. 18, 2009

(65) Prior Publication Data

US 2010/0159308 A1 Jun. 24, 2010

(30) Foreign Application Priority Data

Dec. 24, 2008 (KR) .................. 10-2008-0133808

(51) Int. Cl.
*H01M 2/12* (2006.01)
*H01M 2/08* (2006.01)
*H01M 2/04* (2006.01)
*H01M 2/02* (2006.01)
*H01M 2/34* (2006.01)

(52) U.S. Cl.
CPC ............ *H01M 2/0413* (2013.01); *H01M 2/023* (2013.01); *H01M 2/34* (2013.01); *H01M 2/12* (2013.01); *H01M 2200/00* (2013.01); *H01M 2200/20* (2013.01)

(58) Field of Classification Search
CPC ..... H01M 2/023; H01M 2/0413; H01M 2/34; H01M 2/12; H01M 2/345; H01M 2/0232; H01M 2/1294

USPC .................. 429/56, 185, 164, 71–72, 82, 136
See application file for complete search history.

(56) References Cited

U.S. PATENT DOCUMENTS 627,917 A * 6/1899 Fuld .............................. 429/134
4,320,182 A * 3/1982 Sugalski ......................... 429/94
(Continued)

FOREIGN PATENT DOCUMENTS

| JP | 2004-362956 | 12/2004 |
|----|-------------|---------|
| JP | 2008-159357 | 7/2008 |
| KR | 10-2006-0028059 | 3/2006 |

OTHER PUBLICATIONS

KIPO Notice of Allowance dated Jul. 27, 2011 for Korean Priority Patent Application 10-2008-0133808, 5 pages, 2011.
(Continued)

*Primary Examiner* — Barbara Gilliam
*Assistant Examiner* — Claire L Roe
(74) *Attorney, Agent, or Firm* — Christie, Parker & Hale, LLP

(57) ABSTRACT

A secondary battery having a current interrupt device (CID) between a negative current collecting plate and a case of the secondary battery. The secondary battery includes: an electrode assembly including a positive electrode, a separator, and a negative electrode; a case housing the electrode assembly; a cap assembly coupled to the case for sealing the case; a positive current collecting plate connected to the positive electrode and the cap assembly; an insulator in the case adjacent an end plate of the case; and a negative current collecting plate connected to the negative electrode and the end plate of the case, the end plate being curved convexly toward an inner cavity of the case.

17 Claims, 8 Drawing Sheets

(56) References Cited

U.S. PATENT DOCUMENTS

| | | |
|---|---|---|
| 4,842,965 A * | 6/1989 | Urushiwara et al. ............ 429/56 |
| 4,943,497 A * | 7/1990 | Oishi et al. ...................... 429/53 |
| 5,197,622 A * | 3/1993 | Anderson .................... 220/89.2 |
| 7,378,186 B2 * | 5/2008 | Suzuki et al. ................. 429/162 |
| 2006/0019150 A1 | 1/2006 | Rigobert et al. |
| 2006/0068276 A1 | 3/2006 | Yoo et al. |
| 2008/0182159 A1 * | 7/2008 | Mitani et al. .................... 429/56 |
| 2009/0117459 A1 * | 5/2009 | Hyung et al. ................. 429/185 |
| 2010/0136388 A1 * | 6/2010 | Kim et al. ....................... 429/56 |

OTHER PUBLICATIONS

Patent Abstracts of Japan and English Machine Translation of Japan Publication No. 2008-159357 listed above, 13 pages, 2011.

* cited by examiner

SECONDARY BATTERY

CROSS-REFERENCE TO RELATED APPLICATION

This application claims priority to and the benefit of Korean Patent Application No. 10-2008-0133808 filed in the Korean Intellectual Property Office on Dec. 24, 2008, the entire contents of which are incorporated herein by reference.

BACKGROUND OF THE INVENTION

1. Field of the Invention

The present invention relates to a secondary battery, and more particularly, to a secondary battery having a current interrupt device (CID) between the bottom of a case and a negative current collecting plate.

2. Description of the Related Art

As generally known, a secondary battery can be recharged and discharged, unlike a primary battery. Secondary batteries may be classified into low-capacity batteries and high-capacity batteries.

For example, a low-capacity secondary battery includes unit batteries, and is mainly used for small portable electronic devices, such as cellular phones, laptop computers, and camcorders, whereas high-capacity batteries are used as the power supply for driving motors in hybrid electric vehicles and the like. A high-capacity secondary battery forms a battery module by connecting a plurality of unit batteries in the form of a pack, and is used as the power supply for driving motors in hybrid electric vehicles and the like.

Each of the unit batteries includes an electrode assembly including a positive electrode, a separator, and a negative electrode, a case for accommodating the electrode assembly, and a cap assembly coupled with the case to seal the case and having an electrode terminal electrically connected with the electrode assembly.

For example, in a cylindrical secondary battery, the positive and negative electrodes in the electrode assembly respectively include non-coating portions on which an active material is not coated, and the positive electrode non-coating portion and the negative electrode non-coating portion are positioned at opposite sides to each other.

A negative current collecting plate is attached to the negative electrode non-coating portion, and a positive current collecting plate is attached to the positive electrode non-coating portion. The negative current collecting plate is connected to the case and the positive current collecting plate is connected to the cap assembly to thus draw current to the outside.

When the negative current collecting plate is connected to the case, the case serves as a negative electrode terminal. When the positive current collecting plate is connected to the cap assembly, the cap assembly serves as a positive electrode terminal. The cap assembly and the case are coupled with each other in an insulation structure through a gasket.

The cap assembly includes a cap plate, a positive temperature device, a vent plate, an insulator, a middle plate, a sub-plate, and a connecting member that are sequentially provided from the outside. The connecting member electrically connects the positive current collecting plate and the middle plate. The vent plate and the sub-plate are connected to each other by welding, with the insulator and the middle plate interposed therebetween.

The vent plate forms a vent which is to be connected to the sub-plate, the vent and the sub-plate form a connection portion, and as the connection portion is formed by welding, they are easily broken and disconnected when the internal pressure of the battery rises, to thus cut off current. That is, the current interrupt device (CID) is formed between the vent plate and sub-plate of the cap assembly.

To this end, the vent plate is provided with notches so that the circumference of the vent has a smaller thickness than other portions of the vent plate have. However, such a cap assembly interrupts current while the vent is separated as the notches are ruptured by explosion in the event of an increase of the internal pressure of the battery.

In this manner, the current interrupt device cuts off current after explosion, so that the current interrupt device is not able to properly prevent the explosion of the battery. Moreover, the sub-plate forming the connection portion together with the vent is formed in a plate shape, and hence there is a large dispersion of an operating pressure, i.e., separation pressure, at which the connection portion of the sub-plate and the vent is disconnected.

The above information disclosed in this Background section is only for enhancement of understanding of the background of the invention and therefore it may contain information that does not form the prior art that is already known in this country to a person of ordinary skill in the art.

SUMMARY OF THE INVENTION

The embodiments of the present invention provide a secondary battery which can effectively serve to prevent explosion since current is interrupted by the disconnection of a connection portion before explosion.

The embodiments of the present invention provide a secondary battery which can reduce the dispersion of the operating pressure of a disconnection portion since the connection portion can be designed so as to be disconnected under a predetermined operating pressure.

The embodiments of the present invention provide a secondary battery which improves reliability with respect to current interruption because a disconnected state of the connection portion is firmly maintained even when the internal pressure of the case decreases again as the connection portion between a bottom of the case and a negative current collecting plate is disconnected and the bottom of the case is broken outwardly.

A secondary battery according to one exemplary embodiment of the present invention includes: an electrode assembly including a positive electrode, a separator, and a negative electrode; a case including an end plate and at least one wall extending therefrom defining an inner cavity, the case housing the electrode assembly in the inner cavity; a cap assembly coupled to the case for sealing the case; a positive current collecting plate including a first side connected to the positive electrode in the case and a second side connected to the cap assembly; an insulator in the case adjacent the end plate; and a negative current collecting plate including a first side connected to the negative electrode and a second side adjacent the insulator and connected to the end plate at a connection portion of the end plate, wherein the end plate is curved convexly toward the inner cavity of the case.

The insulator may include: an external circumferential surface portion corresponding to an internal circumferential surface of the at least one wall of the case; a planar portion adjacent the negative current collecting plate; and a recessed portion curved concavely toward the inner cavity of the case and contacting the end plate, wherein an aperture extends between the planar portion and the recessed portion near a center of the insulator, and wherein the negative current collecting plate is connected to the end plate through the aperture.

The negative current collecting plate may further include a protruding portion extending toward and connected to the end plate through the aperture of the insulator at the connection portion.

A portion of the insulator may face the end plate and be curved. The portion of the insulator facing the end plate may contact the end plate and have a curvature corresponding to a curvature of the end plate.

The end plate may be invertible convexly away from the inner cavity of the case to provide a separating space between the end plate and the negative current collecting plate. The end plate may be invertible convexly away from the inner cavity of the case to disconnect the negative current collecting plate from the end plate when an internal pressure in the case is greater than a reference operating pressure.

The end plate may include at least one notch and be collapsible away from the inner cavity of the case at the at least one notch upon an increase of an internal pressure in the case.

The at least one notch may include at least one outer circumferential notch along at least a portion of an outer circumference of the end plate.

The at least one notch may include central notches arranged in a cross pattern at the connection portion of the end plate. The end plate may be configured to rupture away from the inner cavity at the central notches when the internal pressure in the case is greater than a rupturing pressure.

The at least one notch may further include at least one inner circumferential notch connecting the central notches in a circumferential direction.

A portion of the insulator may face the end plate and have a polyhedron shape. A portion of the end plate may face and contact the insulator and have a polyhedron shape.

According to another exemplary embodiment of the present invention, a secondary battery having a current interrupt device between a negative current collecting plate of the secondary battery and a case of the secondary battery includes: an electrode assembly including a positive electrode, a separator, and a negative electrode; a case including an end plate and at least one wall extending therefrom defining an inner cavity, the case housing the electrode assembly in the inner cavity; a cap assembly coupled to the case for sealing the case; a positive current collecting plate connecting the positive electrode to the cap assembly; an insulator adjacent the end plate; and a negative current collecting plate connected to the negative electrode and connectable to the end plate at a connection portion of the end plate, wherein the end plate is curved toward the inner cavity of the case and is connected to the negative current collecting plate when an internal pressure in the case is less than a reference operating pressure, and wherein the end plate is curved away from the inner cavity of the case and is configured to be disconnected from the negative current collecting plate when the internal pressure in the case is greater than the reference operating pressure.

In one embodiment, the end plate includes at least one notch and is collapsible away from the inner cavity of the case at the at least one notch when the internal pressure in the case is greater than the reference operating pressure.

As set forth above, according to one exemplary embodiment of the present invention, the bottom of the case is protruded inward and connected to the negative current collecting plate at the connection portion through an aperture of an insulator, and is configured such that the connection portion is disconnectable to interrupt current before an explosion of the case, thereby preventing explosion.

Since the bottom of the case is curved convexly toward the inside of the case and connected to the negative current collecting plate at the connection portion, the connection portion can be designed so as to be disconnected under a predetermined operating pressure, thus reducing the dispersion of the operating pressure of the connection portion.

Even when the internal pressure of the case decreases after the bottom of the case and the negative current collecting plate are disconnected and the bottom of the case is broken outwardly, the bottom of the case remains inverted concavely away from the inner cavity of the case, thus firmly maintaining a disconnected state of the connection portion. As a result, reliability with respect to current interruption is improved.

DETAILED DESCRIPTION OF THE EMBODIMENTS

Figure 1:
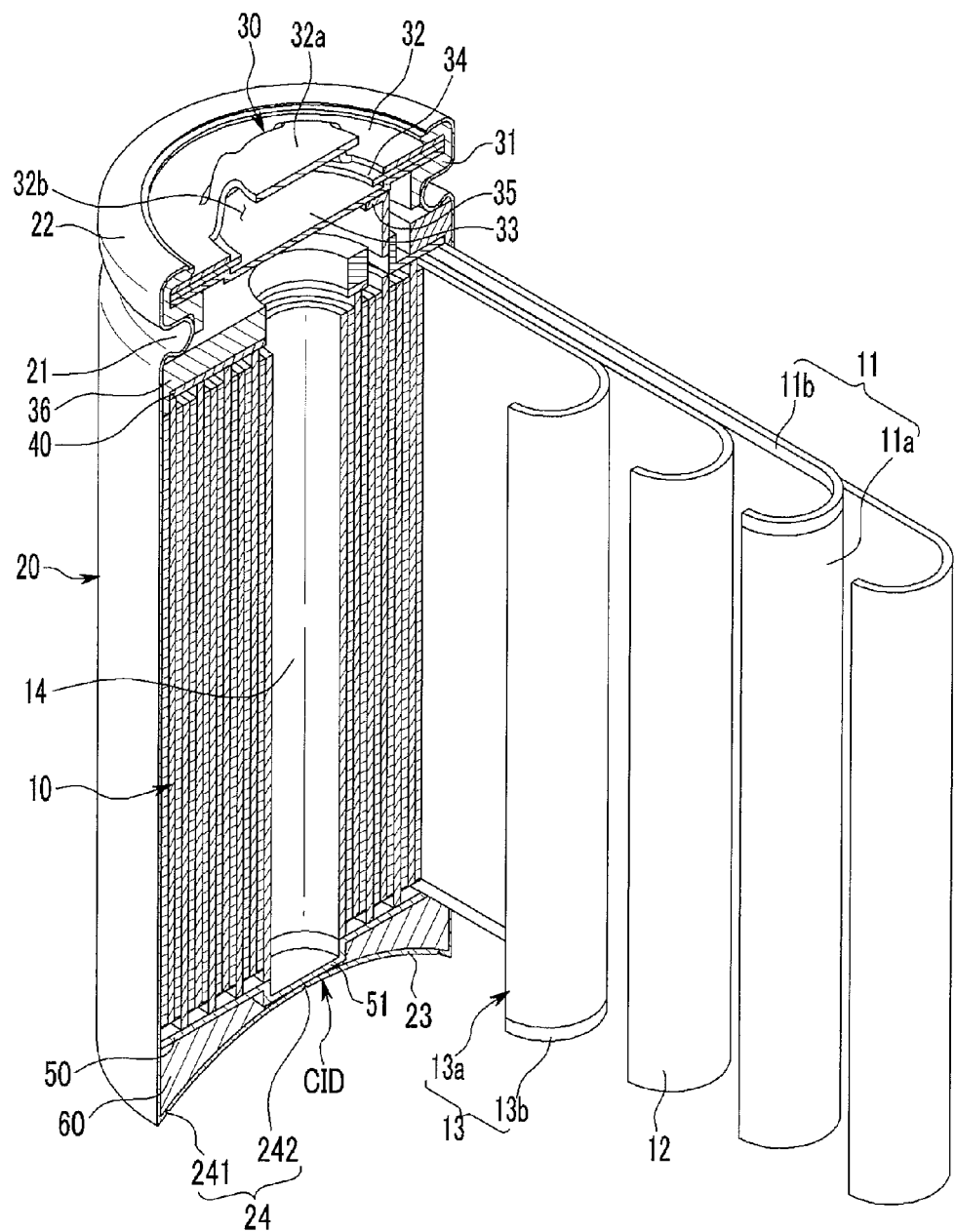
FIG. 1 is a sectional perspective view of a secondary battery according to a first exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

FIG. 1 is a sectional perspective view of a secondary battery according to a first exemplary embodiment of the present invention. Referring to FIG. 1, the secondary battery according to the first exemplary embodiment includes an electrode assembly 10, a case 20, a cap assembly 30, a positive current collecting plate 40, and a negative current collecting plate 50. The case 20 accommodates the electrode assembly 10 and an electrolyte.

The electrode assembly 10 includes a positive electrode 11, a separator 12, and a negative electrode 13. The electrode assembly 10 is formed by winding the positive electrode 11, the negative electrode 13, and the separator 12 of an insulating material disposed therebetween.

In one example, the electrode assembly 10 may be formed in a cylindrical shape. A sector pin 14 is disposed at the center of the cylindrical electrode assembly 10. The sector pin 14 maintains the cylindrical shape of the spirally wound electrode assembly 10.

The positive electrode 11 and the negative electrode 13 are made of a thin metal foil and form a current collecting body, and include respective coating portions 11a and 13a and non-coating portions 11b and 13b which are differentiable according to the application or absence of an active material. That is, the coating portions 11a and 13a have an active material applied thereto, and the non-coating portions 11b and 13b do not have an active material applied thereto.

The case 20 has a space in which the electrode assembly 10 is inserted, and may be formed in a cylindrical or rectangular shape which is open at one end. The case 20 is connected to the negative current collecting plate 50, and serves as a negative electrode terminal in the secondary battery. The case 20 is made of a conductive metal, such as aluminum, an aluminum alloy, or nickel-plated steel.

A cap assembly 30 is coupled with the open end of the case 20 through a gasket 31 configured to seal the case 20 accommodating the electrode assembly 10 and the electrolyte. The cap assembly 30 of the present exemplary embodiment may be provided with a current interrupt device (not shown) or not, as illustrated in FIG. 1.

Before a detailed description of the cap assembly 30 is provided, the positive current collecting plate 40 will be discussed. The positive current collecting plate 40 is connected to the non-coating portion 11b of the positive electrode 11 at the cap assembly 30 side to connect the positive electrode 11 to the cap assembly 30.

The cap assembly 30 includes a cap plate 32 and a sub-plate 33. The cap plate 32 is connected to the positive current collecting plate 40, and serves as a positive electrode terminal in the secondary battery. The cap plate 32 has a terminal 32a protruding to the outside and a vent hole 32b.

A positive temperature coefficient element 34 is installed between the cap plate 32 and the sub-plate 33. The positive temperature coefficient element 34 forms or interrupts current flow between the cap plate 32 and the sub-plate 33. That is, when a preset temperature is exceeded, the electrical resistance of the positive temperature coefficient element 34 increases to a virtually infinite level, thereby stopping the flow of charging or discharging current.

The sub-plate 33 is installed inside the cap plate 32 and connected to the electrode assembly 10. That is, the sub-plate 33 is electrically connected to the positive current collecting plate 40 through a connection member 35.

An insulating member 36 is provided on the positive current collecting plate 40. The insulating member 36 covers the periphery of the positive current collecting plate 40 below a beading portion 21. Hence, the positive current collecting plate 40 is electrically connected to the cap plate 32 through the connection member 35 and the sub-plate 33.

After the cap assembly 30 is inserted into the case 20, the cap assembly 30 is clamped and fixed to the case 20. Hereupon, the beading portion 21 and a clamping portion 22 are formed, and the gasket 31 provides an airtight seal between the case 20 and the cap assembly 30.

The negative current collecting plate 50 is connected to a non-coating portion 13b of the negative electrode 13 on one side and connected to the case 20 on the other side. In order to construct a current interrupt device (CID) between the negative current collecting plate 50 and the case 20, an insulator 60 is interposed between the negative current collecting plate 50 and a bottom 23 of the case 20 (i.e., an endplate 23 of the case 20) to thus electrically insulate the negative current collecting plate 50 and the bottom 23 of the case 20.

The negative current collecting plate 50 is connected to the bottom 23 of the case 20 at a connection portion CP passing through the interposed insulator 60. For example, the negative current collecting plate 50 may contact the bottom 23 of the case 20 at the connection portion CP. Upon an increase of the internal pressure of the case 20, the negative current collecting plate 50 is separated from the bottom 23 of the case 20 at the connection portion CP to thus interrupt current.

Figure 2:
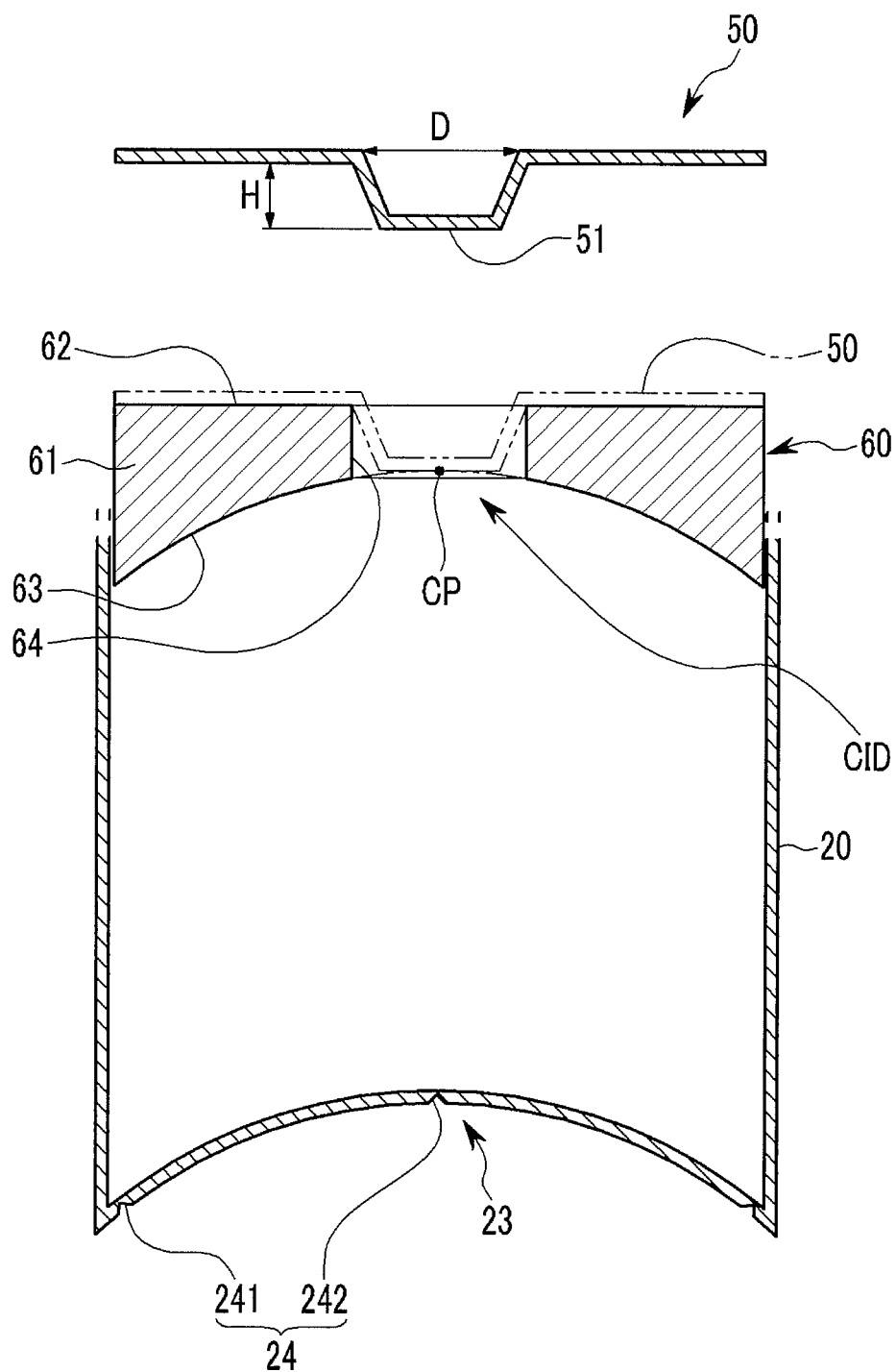
FIG. 2 is an exploded sectional view of a current interrupt device of the secondary battery of FIG. 1.

FIG. 2 is an exploded sectional view of the current interrupt device of FIG. 1. Referring to FIG. 2, that is, the current interrupt device CID may be formed by the negative current collecting plate 50 and the bottom 23 of the case 20 that are mostly insulated through the insulator 60 and partly connected through the connection portion CP.

To form the current interrupt device CID, the bottom 23 of the case 20 is curved convexly toward the inside of the case 20. Further, the bottom 23 of the case 20 is inverted convexly toward the outside of the case 20 and forms a separating space SS during a time from immediately after the bottom 23 of the case 20 is separated from the negative current collecting plate 50 at the connection portion CP due to an increase of the pressure in the case 20 until immediately before the bottom 23 of the case 20 is cut away (see FIGS. 4 and 5).

Before further describing the bottom 23 of the case 20, the insulator 60 will be described in more detail. The insulator 60 includes an external circumferential surface portion 61 corresponding to the internal circumferential surface of the case 20, a planar portion 62 supporting the negative current collecting plate 50; a recessed portion 63 formed concavely and tightly contacting the bottom 23 of the case 20, and a through hole 64 penetrated at the center of the insulator 60 from the planar portion 62 to the recessed portion 63.

The recessed portion 63 of the insulator 60 may be curved facing the bottom 23 of the case 20 on a cut surface directed toward the negative current collecting plate 50 from the positive current collecting plate 40, i.e., on a vertical section of FIGS. 1 and 2. Further, the recessed portion 63 is curved along the circumferential direction and forms an overall three-dimensional curved surface.

The negative current collecting plate 50 further includes a protruding portion 51 connected at the connection portion CP to the bottom 23 of the case 20. The protruding portion 51 is connected to the bottom 23 of the case 20 through the through hole 64 of the insulator 60. Therefore, the protruding portion 51 has a diameter D for insertion into the through hole 64 and a height H for reaching the bottom 23 of the case 20 through the through hole 64.

Again, a portion of the bottom 23 of the case 20 that faces and contacts the recessed portion 63 of the insulator 60 is curved on a cut surface directed toward the negative current collecting plate 50 from the positive current collecting plate 40, i.e., on a vertical section of FIGS. 1 and 2.

Further, the bottom 23 of the case 20 is curved along the circumferential direction and forms an overall three-dimensional curved surface. Accordingly, the bottom 23 of the case 20 and the recessed portion 63 of the insulator 60 maintain a stable contact and coupling structure because they have curved surfaces in contact with each other.

The bottom 23 of the case 20 curved convexly toward the inside of the case 20 and the protruding portion 51 of the negative current collecting plate 50 are connected at the connection portion CP, so that current is interrupted between the negative current collecting plate 50 and the case 20 as the bottom 23 of the case 20 is separated from the connection portion CP upon an increase of the internal pressure of the case 20.

The bottom 23 of the case 20 having an inward convex shape makes clear the connection to and disconnection from the protruding portion 51, thereby reducing the dispersion of an operating pressure of the connection portion CP, which disconnects the connection portion CP at an internal pressure greater than a predetermined operating pressure. Also, the bottom 23 of the case 20 effectively serves to prevent explosion because it forms the separating space SS without explosion as it is disconnected from the connection portion CP.

Figure 3:
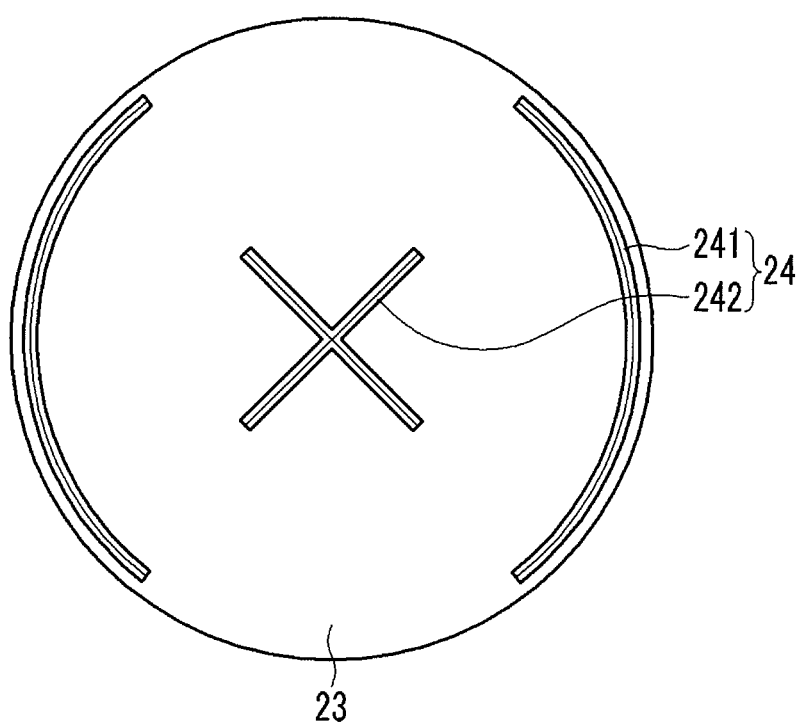
FIG. 3 is a bottom view of a case of the secondary battery of FIG. 2.

FIG. 3 is a bottom view of the case 20 of FIG. 2. Referring to FIGS. 2 and 3, the bottom 23 of the case 20 is provided with at least one notch 24 having a thickness less than the circumferential thickness of the bottom 23 of the case 20. The notch 24 prevents explosion more effectively since it is cut away upon an additional increase of the internal pressure of the case 20 in a state where current is interrupted by the disconnection of the connection portion CP.

For example, the at least one notch 24 includes one or more outer circumferential notches 241 which are formed along the outer circumference on at least part of the outer circumference of the bottom 23 of the case 20. The outer circumferential notches 241 may be formed around the entire circumference of the bottom 23 of the case 20 (not shown), or may be divided by a predetermined length into two (e.g., one on both sides, as shown in FIG. 3) or more.

Figure 4:
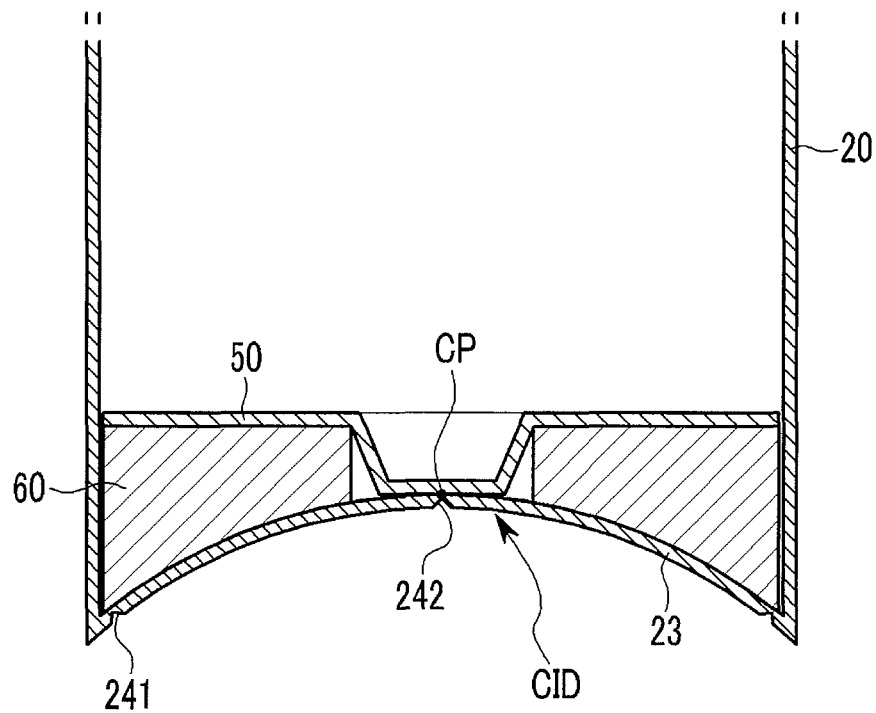
FIG. 4 is a sectional view showing a connected state when a connection portion of a current interrupt device is connected.
Figure 5:
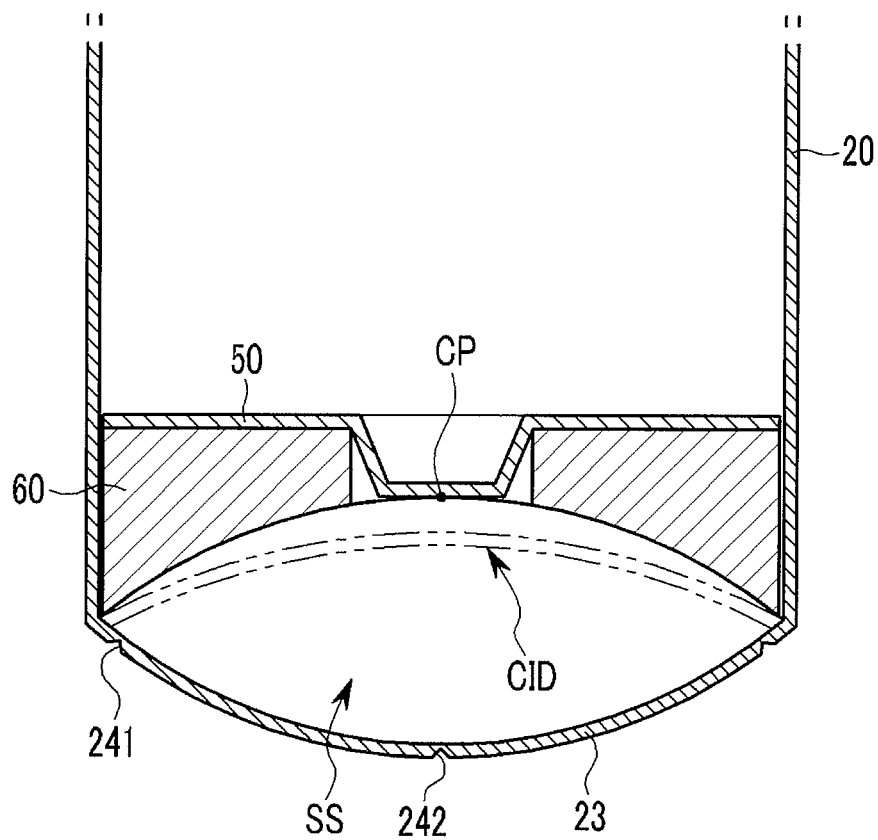
FIG. 5 is a sectional view showing a disconnected state when the connection portion of the current interrupt device of FIG. 4 is disconnected.
Figure 6:
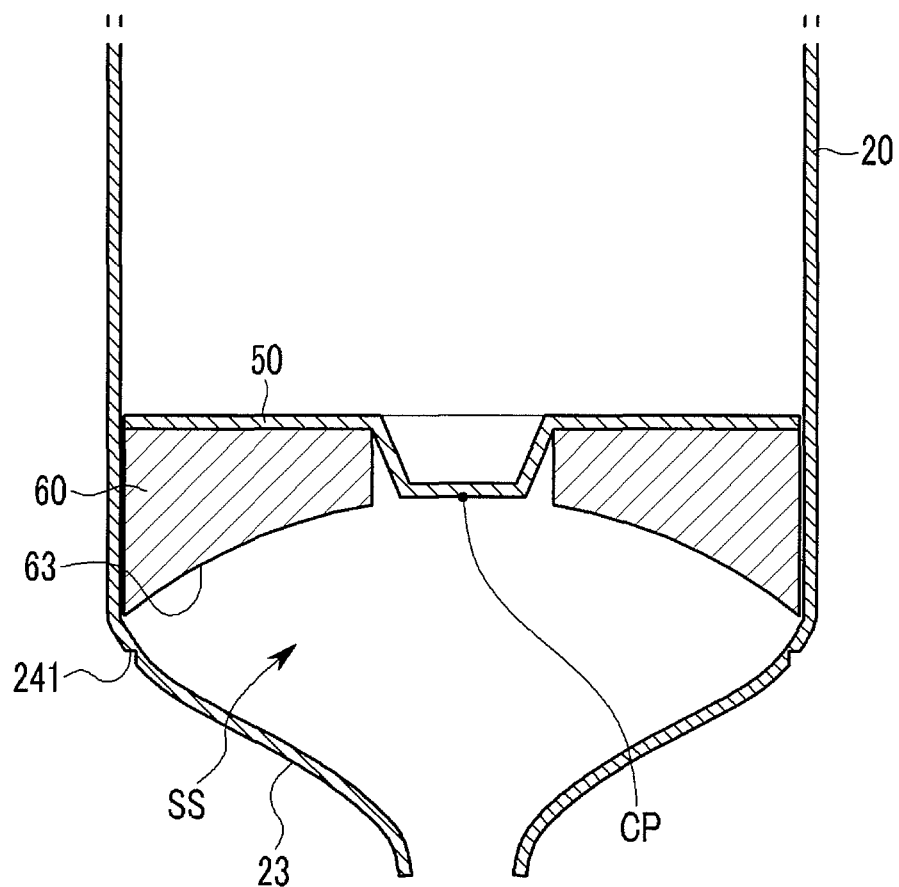
FIG. 6 is a sectional view showing a cut away state after the current interrupt device of FIG. 4 is disconnected.

FIGS. 4 to 6 are sectional views showing operating states. FIG. 4 shows a state when the connection portion CP of the current interrupt device CID is connected, and FIG. 5 shows a state when the connection portion CP is disconnected. The outer circumferential notches 241 induce the inversion of the bottom 23 of the case 20, which is convex toward the inside of the case 20 in a connected operating state, upon an increase of the internal pressure of the case 20 above a predetermined reference pressure, thereby facilitating inversion of the bottom 23 of the case 20 to an outwardly concave position in which the CID is in a disconnected state.

FIG. 6 shows a cut away state after the current interrupt device has disconnected current flow. Referring to FIG. 6, even though the internal pressure is reduced due to the outer circumferential notches 241 inducing inversion of the bottom 23 of the case 20, the separating space SS firmly maintains a disconnected state of the bottom 23 of the case 20 and the negative current collecting plate 50, thereby improving reliability with respect to current interruption.

Referring again to FIG. 3, the at least one notch 24 includes one or more central notches 242 which are formed in a cross pattern at the connection portion CP of the bottom 23 of the case 20. The central notches 242 may be formed over the entire diameter of the bottom 23 of the case 20 (not shown), or may be formed in a cross pattern at a predetermined length at the center part of the bottom 23 of the case 20 as shown in FIG. 3.

The central notches 242 are able to cut away the center part of the bottom 23 of the case 20 even if they are not inverted from the outer circumferential notches 241. The central notches 242 firmly maintain a disconnected state of the bottom 23 of the case 20 and the negative current collecting plate 50 because they are directed toward the outside of the case 20 as they are cut away around the connection portion CP, i.e., at the center part of the bottom 23 of the case 20.

The bottom 23 of the case 20 operated as described above may be provided with either the outer circumferential notches 241 or the central notches 242 at the bottom 23 of the case 20, or may be provided with both the outer circumferential notches 241 and the central notches 242, as shown in FIG. 3.

When comparing the following second exemplary embodiment with the first exemplary embodiment, descriptions of identical or similar components will be omitted, and different components will be described.

Figure 7:
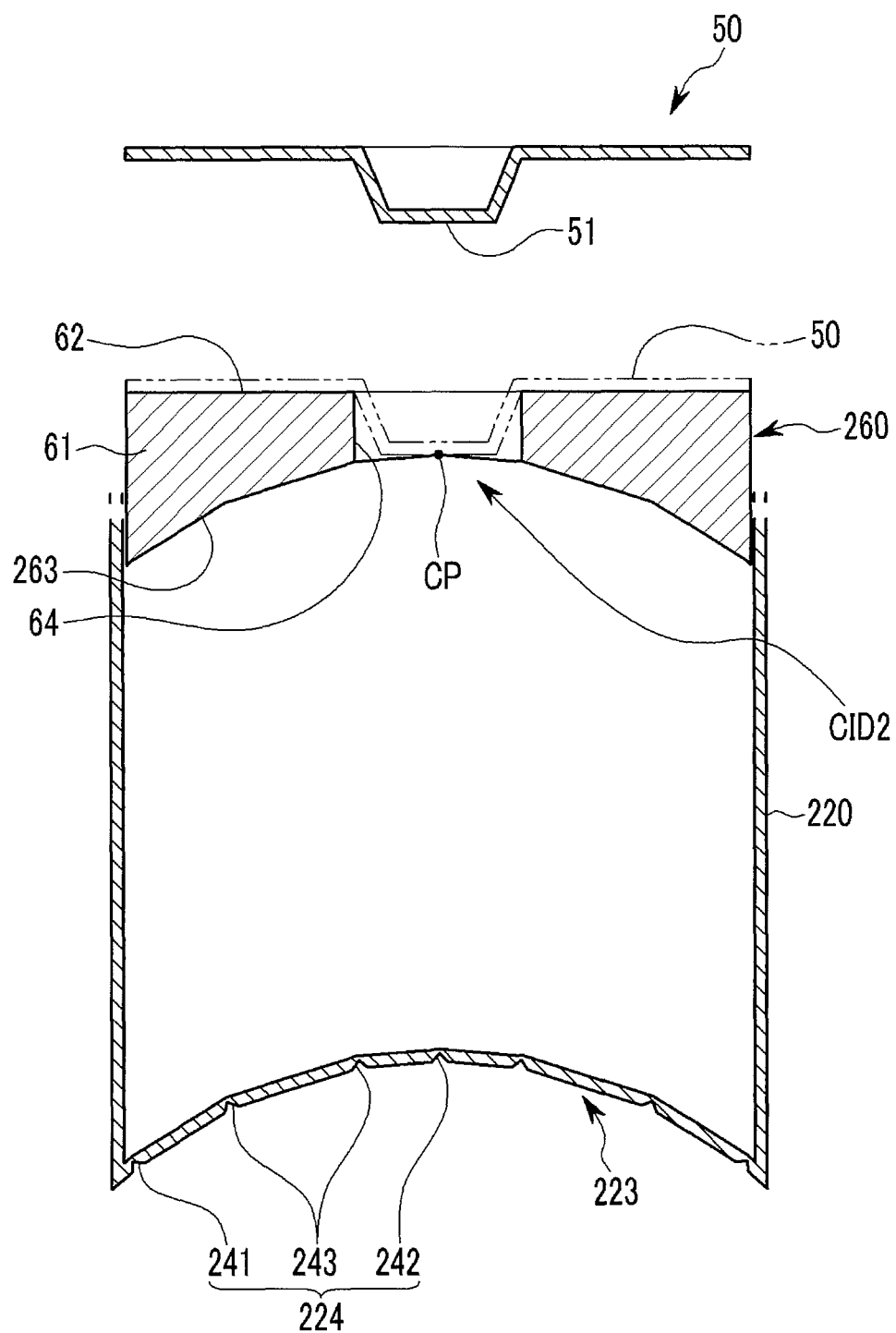
FIG. 7 is an exploded sectional view of a current interrupt device of a secondary battery according to a second exemplary embodiment of the present invention.
Figure 8:
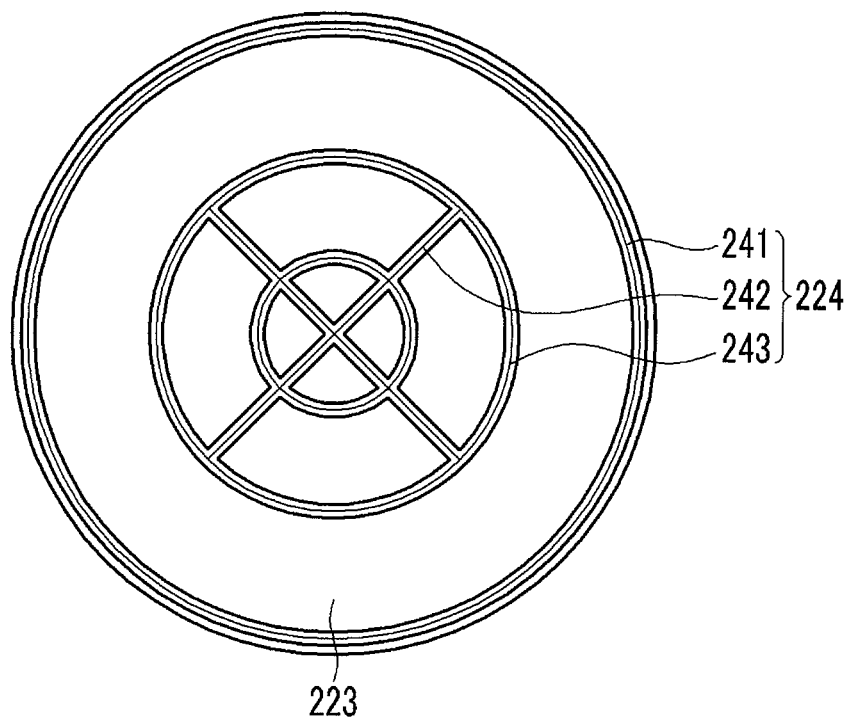
FIG. 8 is a bottom view of a case of the secondary battery of FIG. 7.

FIG. 7 is an exploded sectional view of a current interrupt device in a secondary battery according to a second exemplary embodiment of the present invention. FIG. 8 is a bottom view of a case of the secondary battery of FIG. 7.

Referring to FIGS. 7 and 8, a current interrupt device CID2 according to the second exemplary embodiment is provided within a through hole 64 of an insulator 260, and where a recessed portion 263 of the insulator 260 and a bottom 223 of a case 220 face and contact each other is formed in a polyhedron. A polygonal line of the recessed portion 263 may be shown on a cut surface directed toward the negative current collecting plate 50 from the positive current collecting plate 40, i.e., on a vertical section of FIG. 7.

Further, the recessed portion 263 is formed in a curved line along the circumferential direction of the bottom 223 of the case 220 to form a plurality of curved surfaces divided at angulated parts of the polygonal line. Accordingly, the bottom 223 of the case 220 and the recessed portion 263 of the insulator 260 are in linear contact with each other at the angulated parts, and are in surface contact with each other at the other parts, thereby maintaining a stable contact and coupling structure.

The bottom 223 of the case 220 includes at least one notch 224 which further includes inner circumferential notches 243 which are formed in a circumferential direction between the central notches 242 and the outer circumferential notches 241. The inner circumferential notches 243 may be formed in a singular number (not shown), or may be formed in a plural number having a pattern of concentric circles as shown in FIG. 8.

Therefore, the inner circumferential notches 243 are formed by connecting the central notches 242 in the circumferential direction. The inner circumferential notches 243 enable the bottom 223 of the case 220 to be cut away between the center part and outer circumferential part of the bottom 223 of the case 220 even if the outer circumferential notches 241 are not inverted. The bottom 223 of the case 220 forms angulated parts at the at least one notch 224, and comes into contact corresponding to the angulated parts formed on the recessed portion 263.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A secondary battery comprising:
   an electrode assembly comprising a positive electrode, a separator, and a negative electrode;
   a case comprising an end plate and at least one wall extending therefrom defining an inner cavity, the case housing the electrode assembly in the inner cavity;
   a cap assembly coupled to the case for sealing the case;
   a positive current collecting plate comprising a first side connected to the positive electrode in the case and a second side connected to the cap assembly;
   an insulator in the case adjacent the end plate; and
   a negative current collecting plate comprising a first side connected to the negative electrode and a second side adjacent the insulator and connected to the end plate at a connection portion of the end plate, wherein the end plate is curved convexly toward the inner cavity of the case from one side of the case to another side of the case in its entirety, and wherein the end plate comprises at least one notch having a thickness less than a thickness of an adjacent portion of the end plate.

2. The secondary battery of claim 1, wherein the insulator comprises:

an external circumferential surface portion corresponding to an internal circumferential surface of the at least one wall of the case;

a planar portion adjacent the negative current collecting plate; and a recessed portion curved concavely toward the inner cavity of the case and contacting the end plate, wherein an aperture extends between the planar portion and the recessed portion near a center of the insulator, and wherein the negative current collecting plate is connected to the end plate through the aperture.

3. The secondary battery of claim 2, wherein the negative current collecting plate further comprises a protruding portion extending toward and connected to the end plate through the aperture of the insulator at the connection portion.

4. The secondary battery of claim 1, wherein a portion of the insulator faces the end plate and is curved.

5. The secondary battery of claim 4, wherein the portion of the insulator facing the end plate contacts the end plate and has a curvature corresponding to a curvature of the end plate.

6. The secondary battery of claim 1, wherein the end plate is invertible convexly away from the inner cavity of the case to provide a separating space between the end plate and the negative current collecting plate.

7. The secondary battery of claim 6, wherein the end plate is invertible convexly away from the inner cavity of the case to disconnect the negative current collecting plate from the end plate when an internal pressure in the case is greater than a reference operating pressure.

8. The secondary battery of claim 1, wherein the end plate is collapsible away from the inner cavity of the case at the at least one notch upon an increase of an internal pressure in the case.

9. The secondary battery of claim 8, wherein the at least one notch comprises at least one outer circumferential notch along at least a portion of an outer circumference of the end plate.

10. The secondary battery of claim 8, wherein the at least one notch comprises central notches arranged in a cross pattern at the connection portion of the end plate.

11. The secondary battery of claim 10, wherein the at least one notch further comprises at least one outer circumferential notch along at least a portion of an outer circumference of the end plate.

12. The secondary battery of claim 10, wherein the end plate is configured to rupture away from the inner cavity at the central notches when the internal pressure in the case is greater than a rupturing pressure.

13. The secondary battery of claim 10, wherein the at least one notch further comprises at least one inner circumferential notch connecting the central notches in a circumferential direction.

14. The secondary battery of claim 1, wherein a portion of the insulator faces the end plate and has a polyhedron shape.

15. The secondary battery of claim 14, wherein a portion of the end plate faces and contacts the insulator and has a polyhedron shape.

16. A secondary battery having a current interrupt device between a negative current collecting plate of the secondary battery and a case of the secondary battery, the secondary battery comprising:

an electrode assembly comprising a positive electrode, a separator, and a negative electrode;

a case comprising an end plate and at least one wall extending therefrom defining an inner cavity, the case housing the electrode assembly in the inner cavity;

a cap assembly coupled to the case for sealing the case;

a positive current collecting plate connecting the positive electrode to the cap assembly;

an insulator adjacent the end plate; and a negative current collecting plate connected to the negative electrode and connectable to the end plate at a connection portion of the end plate, wherein the end plate is curved convexly toward the inner cavity of the case from one side of the case to another side of the case in its entirety and the end plate is connected to the negative current collecting plate when an internal pressure in the case is less than a reference operating pressure, and wherein the end plate is curved away from the inner cavity of the case and is configured to be disconnected from the negative current collecting plate when the internal pressure in the case is greater than the reference operating pressure, and wherein the end plate comprises at least one notch having a thickness less than a thickness of an adjacent portion of the end plate.

17. The secondary battery of claim 16, wherein the end plate is collapsible away from the inner cavity of the case at the at least one notch when the internal pressure in the case is greater than the reference operating pressure.

* * * * *